United States Patent
Sakata et al.

(10) Patent No.: US 10,900,508 B2
(45) Date of Patent: Jan. 26, 2021

(54) FLOW DAMPER, PRESSURE-ACCUMULATION AND WATER-INJECTION APPARATUS, AND NUCLEAR INSTALLATION

(71) Applicant: MITSUBISHI HEAVY INDUSTRIES, LTD., Tokyo (JP)

(72) Inventors: Hideyuki Sakata, Tokyo (JP); Shigeto Hirai, Tokyo (JP); Taiki Asahara, Tokyo (JP); Takafumi Ogino, Tokyo (JP); Akira Kirita, Tokyo (JP); Akihiro Toda, Tokyo (JP); Masamichi Iino, Tokyo (JP); Toshihiro Sato, Tokyo (JP); Yutaka Tanaka, Tokyo (JP); Takanori Okazaki, Tokyo (JP); Takashi Nakahara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 417 days.

(21) Appl. No.: 15/748,413

(22) PCT Filed: Jan. 27, 2017

(86) PCT No.: PCT/JP2017/002926
§ 371 (c)(1),
(2) Date: Jan. 29, 2018

(87) PCT Pub. No.: WO2017/138374
PCT Pub. Date: Aug. 17, 2017

(65) Prior Publication Data
US 2018/0218795 A1    Aug. 2, 2018

(30) Foreign Application Priority Data
Feb. 9, 2016  (JP) ................. 2016-022399

(51) Int. Cl.
*F15D 1/00* (2006.01)
*G21C 15/243* (2006.01)
*G21C 15/18* (2006.01)

(52) U.S. Cl.
CPC .......... *F15D 1/0015* (2013.01); *G21C 15/18* (2013.01); *G21C 15/243* (2013.01); *G21C 15/185* (2019.01); *Y02E 30/30* (2013.01)

(58) Field of Classification Search
CPC ............................ F15D 1/009; F15D 1/0015
(Continued)

(56) References Cited

U.S. PATENT DOCUMENTS 4,021,298 A   5/1977  Jones
4,072,559 A   2/1978  Neidl et al.
(Continued)

FOREIGN PATENT DOCUMENTS

EP    2 392 771 A2   12/2011
JP    62-184499 U    11/1987
(Continued)

OTHER PUBLICATIONS

Extended (Supplementary) European Search Report dated May 30, 2018, issued in counterpart application No. 17750099.8. (9 pages).
(Continued)

*Primary Examiner* — Sharon M Davis
(74) *Attorney, Agent, or Firm* — Westerman, Hattori, Daniels & Adrian, LLP

(57) ABSTRACT

To include a cylindrical vortex chamber 35, a small flow-rate pipe 37 connected to a peripheral plate 35C of the vortex chamber 35 along a tangential direction thereof, a large flow-rate pipe 36 connected to the peripheral plate 35C with a predetermined angle with respect to the small flow-rate pipe 37, an outlet pipe connected to an outlet 39 formed in a central part of the vortex chamber 35, and a straightening
(Continued)

plate 50 that is arranged in a part between the outlet 39 and the peripheral plate 35C of the vortex chamber 35, and when jets flow into the vortex chamber 35 from the small flow-rate pipe 37 and the large flow-rate pipe 36, straightens impinging jets from the small flow-rate pipe 37 and from the large flow-rate pipe 36 having flowed into the vortex chamber 35 toward the outlet 39.

7 Claims, 14 Drawing Sheets

(58) Field of Classification Search
USPC .......................................... 137/808, 812, 813
See application file for complete search history.

(56) References Cited

U.S. PATENT DOCUMENTS

| | | | |
|---|---|---|---|
| 4,158,637 | A | 6/1979 | Jones |
| 4,668,465 | A | 5/1987 | Boomgaard et al. |
| 4,762,670 | A | 8/1988 | Yoshida et al. |
| 4,786,464 | A | 11/1988 | Bardot |
| 4,851,183 | A | 7/1989 | Hampel |
| 4,851,186 | A | 7/1989 | Berte et al. |
| 5,309,488 | A | 5/1994 | Matsuoka |
| 5,623,109 | A | 4/1997 | Uchida et al. |
| 5,817,958 | A | 10/1998 | Uchida et al. |
| 7,522,693 | B2 | 4/2009 | Eoh et al. |
| 7,757,715 | B2 | 7/2010 | Shiraishi |
| 7,881,421 | B2 * | 2/2011 | Shiraishi ................ G21C 15/18 376/282 |
| 8,070,892 | B2 | 12/2011 | Jeong et al. |
| 8,276,669 | B2 * | 10/2012 | Dykstra .................. E21B 43/12 166/316 |
| 8,670,518 | B2 | 3/2014 | Eoh et al. |
| 8,893,804 | B2 * | 11/2014 | Fripp ...................... E21B 47/18 166/373 |
| 9,099,205 | B2 | 8/2015 | Park et al. |
| 2008/0121300 | A1 * | 5/2008 | Shiraishi ................ G21C 15/18 137/833 |
| 2009/0180581 | A1 | 7/2009 | Shiraishi |
| 2009/0268860 | A1 | 10/2009 | Lu |
| 2012/0281802 | A1 | 11/2012 | Niida |
| 2013/0294560 | A1 | 11/2013 | Graham |
| 2015/0187445 | A1 | 7/2015 | Kim et al. |
| 2016/0042816 | A1 | 2/2016 | Yi et al. |

FOREIGN PATENT DOCUMENTS

| | | |
|---|---|---|
| JP | 63-19597 A | 1/1988 |
| JP | 4-328494 A | 11/1992 |
| JP | 5-256982 A | 10/1993 |
| JP | 10-148692 A | 6/1998 |
| JP | 4533957 B2 | 6/2010 |
| KR | 2002 0036483 A | 5/2002 |
| WO | 2008/065889 A1 | 6/2008 |
| WO | 2010/049721 A1 | 5/2010 |
| WO | 2011/114782 A1 | 9/2011 |

OTHER PUBLICATIONS

International Search Report dated Mar. 28, 2017, issued in counterpart International Application No. PCT/JP2017/002926 (6 pages, including Japanese original and English translation).
Written Opinion of the International Searching Authority dated Mar. 28, 2017, issued in counterpart International Application No. PCT/JP2017/002926 (8 pages, including Japanese original and English translation).

* cited by examiner

FLOW DAMPER, PRESSURE-ACCUMULATION AND WATER-INJECTION APPARATUS, AND NUCLEAR INSTALLATION

FIELD

The present invention relates to a flow damper that statically performs switching of a water-injection flow rate from a large flow rate to a small flow rate, a pressure-accumulation and water-injection apparatus including therein the flow damper, and a nuclear installation including the pressure-accumulation and water-injection apparatus.

BACKGROUND

Generally, there is a type of pressure-accumulation and water-injection apparatus that includes a tank (an airtight container) for storing water (coolant) therein, in which the stored water is pressurized by pressurized gas (nitrogen gas) enclosed in an upper part of the tank. The pressure-accumulation and water-injection apparatus includes in the tank, a flow damper that can perform switching of a water-injection flow rate to a nuclear reactor from a large flow rate to a small flow rate statically (without using a movable portion). The pressure-accumulation and water-injection apparatus including such a flow damper is used, for example, as a nuclear reactor-internal cooling facility for emergency of a nuclear installation including a pressurized water nuclear reactor (PWR).

As the flow damper of the pressure-accumulation and water-injection apparatus, there has been conventionally known a flow damper that includes a cylindrical vortex chamber, a small flow-rate pipe connected to a peripheral edge of the vortex chamber along a tangential direction thereof, a large flow-rate pipe connected to the peripheral edge with a predetermined angle with respect to the small flow-rate pipe, and an outlet pipe connected to an outlet formed in a central part of the vortex chamber (see Patent Literature 1).

In this type of flow damper, inlets of the small flow-rate pipe and the large flow-rate pipe are respectively open in the tank of the pressure-accumulation and water-injection apparatus, and the small flow-rate pipe is provided such that an inlet height thereof is lower than that of the large flow-rate pipe. In the pressure-accumulation and water-injection apparatus, if a water level in the tank is low and below an inlet position of the large flow-rate pipe, water flows into the cylindrical vortex chamber only from the small flow-rate pipe, to form a swirling flow that flows along an inner periphery of the vortex chamber, and flows out from the outlet in a state where outflow resistance is high. Therefore, a water-injection flow rate of water injected from the outlet to the nuclear reactor becomes low. On the other hand, if the water level in the tank of the pressure-accumulation and water-injection apparatus is high and exceeds the inlet position of the large flow-rate pipe, water flows into the vortex chamber from both the small flow-rate pipe and the large flow-rate pipe. In this case, jets from the small flow-rate pipe and from the large flow-rate pipe impinge on each other in the vortex chamber, and the impinging jets form a non-swirling flow that flows straight toward the outlet. Therefore, the outflow resistance becomes low and the water-injection flow rate of water injected from the outlet to the nuclear reactor becomes higher than an increase of an inflow sectional area into the vortex chamber.

However, in the flow damper described above, if there is a manufacturing error in the size of the vortex chamber, the small flow-rate pipe, or the large flow-rate pipe or there is a disturbance in the water flow flowing into the vortex chamber, the pressure (flow rate) of the jet respectively flowing from the small flow-rate pipe and the large flow-rate pipe is imbalanced. Therefore, the impinging jets of the respective jets flow to a direction deviated from the outlet to form a swirling flow, and thus the outflow resistance may increase to cause a problem in which a necessary flow rate cannot be acquired.

To solve this problem, conventionally, there has been proposed a flow damper in which two openings are provided in a peripheral edge of a vortex chamber and a pressure equalizing passage for communicating between these openings is famed (see Patent Literature 2). In this configuration, even if the pressure (flow rate) of the jet respectively flowing from a small flow-rate pipe and a large flow-rate pipe is imbalanced, a pressure equalizing pipe offsets the pressure difference, thereby enabling to prevent a decrease of the water-injection flow rate.

CITATION LIST

Patent Literature

Patent Literature 1: Japanese Patent No. 4533957 B
Patent Literature 2: Japanese Patent Application Laid-open No. H10-148692 A

SUMMARY

Technical Problem

However, according to the conventional configurations, the pressure equalizing passage needs to be provided outside of a cylindrical vortex chamber, and thus the structure of the flow damper becomes complicated and the flow damper becomes large. Therefore, it may be difficult to provide the pressure equalizing passage in a limited space in a tank.

The present invention has been achieved in view of the above problems, and an object of the present invention is to provide a flow damper that can perform water injection with a required flow rate while suppressing an increase in its size, and a pressure-accumulation and water-injection apparatus and a nuclear installation.

Solution to Problem

To achieve the above object, a flow damper according to the present invention includes a cylindrical vortex chamber, a first inlet pipe connected to a peripheral edge of the vortex chamber along a tangential direction thereof, a second inlet pipe connected to the peripheral edge with a predetermined angle with respect to the first inlet pipe, an outlet pipe connected to an outlet formed in a central part of the vortex chamber, and a straightening plate that is arranged in a part between the outlet and the peripheral edge of the vortex chamber, and when jets flow into the vortex chamber from the first inlet pipe and the second inlet pipe, straightens impinging jets from the first inlet pipe and from the second inlet pipe having flowed into the vortex chamber toward the outlet.

According to the flow damper, even if the jet from the first inlet pipe and the jet from the second inlet pipe flowing into the vortex chamber are imbalanced, the straightening plates provided in a part between the outlet and the peripheral edge straighten the impinging jets toward the outlet. Therefore, water injection in a required flow rate can be performed at the time of a large flow rate when the jets flow into the vortex chamber from both the first inlet pipe and the second inlet pipe. Further, because the straightening plates are provided in the vortex chamber, an increase in size of the flow damper can be suppressed.

Further, in the flow damper according to the present invention, when a jet from the first inlet pipe flows into the vortex chamber and a jet from the second inlet pipe does not flow into the vortex chamber, the straightening plate straightens a jet from the first inlet pipe having flowed into the vortex chamber along an inner periphery of the vortex chamber. According to this configuration, because the straightening plates do not largely block the flow of a swirling flow flowing along the inner periphery of the vortex chamber, thereby enabling to prevent that the water injection flow rate is degraded at the time of a small flow rate when the jet from the first inlet pipe flows into the vortex chamber and the jet from the second inlet pipe does not flow into the vortex chamber.

Further, in the flow damper according to the present invention, the straightening plate is famed in an arc-like shape of a concentric circle of the outlet. According to this configuration, straightening plates having a simple shape can realize flow straightening at the time of a large flow rate to straighten the flow of the impinging jets of the jet from the first inlet pipe and the jet from the second inlet pipe toward the outlet, and flow straightening at the time of a small flow rate to straighten the flow of the jet from the first inlet pipe along the inner periphery of the vortex chamber.

Further, in the flow damper according to the present invention, the straightening plate is arranged on opposite sides putting therebetween a straight line connecting an impinging point of a jet from the first inlet pipe and a jet from the second inlet pipe to a center of the outlet. According to this configuration, even if the impinging jets of the jet from the first inlet pipe and the jet from the second inlet pipe having flowed into the vortex chamber are biased to either side of the straight line described above to flow, the flow can be straightened toward the outlet reliably by the straightening plates.

Further, in the flow damper according to the present invention, the straightening plate is provided with a concavo-convex portion on a contact surface that comes into contact with the jet. According to this configuration, because outflow resistance of a swirling flow flowing along the inner periphery of the vortex chamber can be increased at the time of a small flow rate, a high ratio of cooling water quantity flowing from the outlet between at the time of a small flow rate and at the time of a large flow rate can be held. Further, in the flow damper according to the present invention, the second inlet pipe is a pipe conduit having a diameter larger than that of the first inlet pipe. According to this configuration, the flow rate of the cooling water flowing into the vortex chamber can be easily adjusted.

To achieve the above object, a pressure-accumulation and water-injection apparatus according to the present invention includes an airtight container capable of storing therein cooling water in a pressurized state, and the flow damper according to at least one described above that is arranged in the airtight container in a mode in which the outlet pipe is pulled out to outside of the airtight container.

According to the pressure-accumulation and water-injection apparatus, when the cooling water stored in the airtight container in a pressurized state is injected to outside of the airtight container from the outlet pipe via the flow damper, even if the jet from the first inlet pipe and the jet from the second inlet pipe flowing into the vortex chamber are imbalanced, the straightening plates provided in a part between the outlet and the peripheral edge straighten the flow of the impinging jets toward the outlet. Accordingly, water injection at a required flow rate can be performed at the time of a large flow rate when the jets flow into the vortex chamber from both the first inlet pipe and the second inlet pipe. Further, because the straightening plates are provided in the vortex chamber, an increase in size of the flow damper can be suppressed, and the flow damper can be arranged in the airtight container orderly.

To achieve the above object, a nuclear installation according to the present invention generates a high-temperature fluid by heat generated in a nuclear reactor and uses the high-temperature fluid by feeding the high-temperature fluid through a coolant pipe. The outlet pipe pulled out to outside of the airtight container in the pressure-accumulation and water-injection apparatus described above is connected to middle of the coolant pipe leading to the nuclear reactor, and a valve is provided in middle of the outlet pipe.

According to the nuclear installation, water injection to the nuclear reactor is necessary, and when cooling water stored in the airtight container in a pressurized state is injected to outside of the airtight container from the outlet pipe via the flow damper, even if the jet from the first inlet pipe and the jet from the second inlet pipe flowing into the vortex chamber are imbalanced, the straightening plates provided in a part between the outlet and the peripheral edge straighten the flow of the impinging jets toward the outlet. Accordingly, water injection at a required flow rate can be performed at the time of a large flow rate when the jets flow into the vortex chamber from both the first inlet pipe and the second inlet pipe.

Advantageous Effects of Invention

According to the present invention, even if a jet from a first inlet pipe and a jet from a second inlet pipe flowing into a vortex chamber are imbalanced, straightening plates provided in a part between an outlet and a peripheral edge straighten the flow of impinging jets toward the outlet. Accordingly, water injection at a required flow rate can be performed at the time of a large flow rate when the jets flow into the vortex chamber from both the first inlet pipe and the second inlet pipe. Further, because the straightening plates are provided in the vortex chamber, an increase in size of a flow damper can be suppressed.

DESCRIPTION OF EMBODIMENTS

An embodiment of the present invention will be described in detail below with reference to the accompanying drawings. The present invention is not limited to the embodiment. Further, constituent elements according to the following embodiment include those that can be easily replaced by persons skilled in the art or that are substantially the same.

Figure 1:
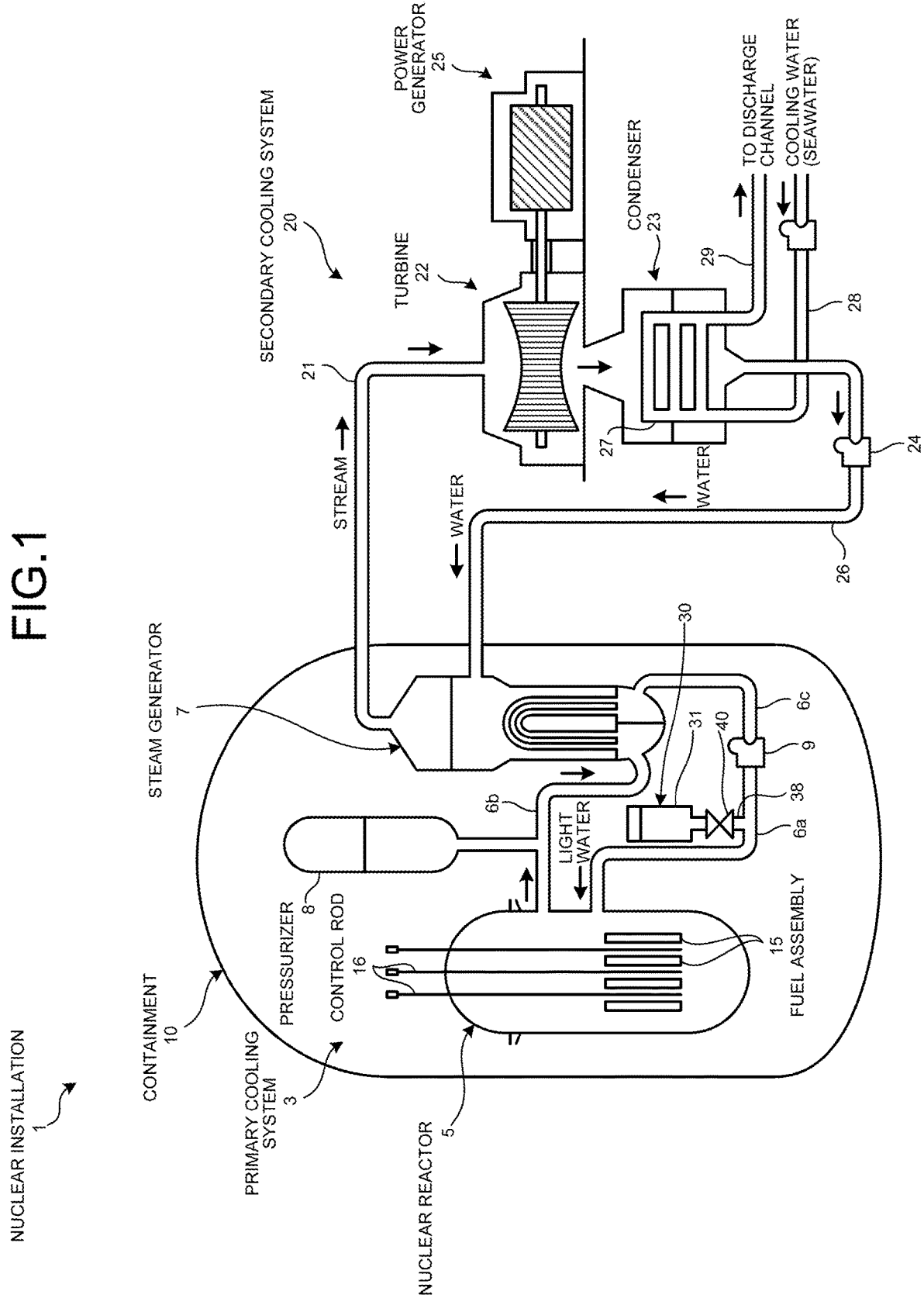
FIG. 1 is a schematic configuration diagram of an example of a nuclear installation according to an embodiment of the present invention.

FIG. 1 is a schematic configuration diagram of an example of a nuclear installation according to the present embodiment.

As illustrated in FIG. 1, in a nuclear installation 1, a pressurized water nuclear reactor (PWR) is used as a nuclear reactor 5. In the nuclear installation 1, after a primary coolant is heated in the nuclear reactor 5, the primary coolant (water) being a high-temperature fluid that has become a high temperature is fed to a steam generator 7 by a coolant pump 9. In the nuclear installation 1, the high-temperature primary coolant is heat-exchanged with a secondary coolant to evaporate the secondary coolant in the steam generator 7, and the evaporated secondary coolant (steam) is fed to a turbine 22 to drive a power generator 25, thereby performing power generation. The primary coolant is light water to be used as a coolant and a neutron moderator.

The nuclear installation 1 includes the nuclear reactor 5 and the steam generator 7 connected to the nuclear reactor 5 via coolant pipes 6a, 6b, and 6c, which are famed of a cold leg 6a, a crossover leg 6c, and a hot leg 6b. A pressurizer 8 is interposed in the hot leg 6b. Further, the coolant pump 9 is interposed between the cold leg 6a and the crossover leg 6c. A primary cooling system 3 of the nuclear installation 1 is configured by the nuclear reactor 5, the coolant pipes 6a, 6b, and 6c, the steam generator 7, the pressurizer 8, and the coolant pump 9, and these elements are accommodated in a containment 10. Although not illustrated in the drawings, the steam generator 7 is provided in plural, and each of the steam generators 7 is connected to the nuclear reactor 5 via the coolant pipes 6a, 6b, and 6c provided in a pair respectively.

The nuclear reactor 5 is a pressurized-water nuclear reactor as described above, and the inside thereof is filled with a primary coolant. The nuclear reactor 5 accommodates therein a large number of fuel assemblies 15 filled with the primary coolant. In the nuclear reactor 5, a large number of control rods 16 that control nuclear fission of the fuel assemblies 15 are provided so as to be able to be inserted in each of the fuel assemblies 15. When the fuel assembly 15 undergoes fission while fission reaction is controlled by the control rods 16 and boron concentration in the primary coolant, thermal energy is generated by the nuclear fission. The generated thermal energy heats the primary coolant and the heated primary coolant becomes a high temperature fluid.

The pressurizer 8 interposed in the hot leg 6b pressurizes the high-temperature primary coolant to suppress boiling of the primary coolant. The steam generator 7 causes the high-temperature and high-pressure primary coolant to perform heat-exchange with the secondary coolant, thereby evaporating the secondary coolant to generate steam, and cooling the high-temperature and high-pressure primary coolant. The coolant pump 9 circulates the primary coolant in the primary cooling system 3, and feeds the primary coolant from the steam generator 7 to the nuclear reactor 5 via the cold leg 6a and the crossover leg 6c, and feeds the primary coolant from the nuclear reactor 5 to the steam generator 7 via the hot leg 6b.

A series of operations in the primary cooling system 3 of the nuclear installation 1 is described here. When the primary coolant is heated by the thermal energy generated by the fission reaction in the nuclear reactor 5, the heated primary coolant is fed to the steam generator 7 by the respective coolant pumps 9 via the hot leg 6b. The high-temperature primary coolant passing through the hot leg 6b is pressurized by the pressurizer 8 to suppress boiling, and flows into the steam generator 7 in a high-temperature and high-pressure state. The entire primary coolant system is pressurized by the pressurizer 8 to suppress boiling also in the nuclear reactor 5, which is a heating portion. The high-temperature and high-pressure primary coolant having flowed into the steam generator 7 is cooled by performing heat-exchange with the secondary coolant, and the cooled primary coolant is fed by the coolant pump 9 to the nuclear reactor 5 via the cold leg 6a. The cooled primary coolant flows into the nuclear reactor 5 to cool the nuclear reactor 5.

The nuclear installation 1 includes the turbine 22 connected to the steam generator 7 via a steam pipe 21, a condenser 23 connected to the turbine 22, a feed-water pump 24 interposed in a feed-water pipe 26 that connects between the condenser 23 and the steam generator 7, and a secondary cooling system 20 is configured by these units. The secondary coolant that circulates in the secondary cooling system 20 evaporates in the steam generator 7 to become gas (steam), and is returned from gas to liquid in the condenser 23. The power generator 25 is connected to the turbine 22.

A series of operations in the secondary cooling system 20 of the nuclear installation 1 is described here. When steam flows into the turbine 22 from each of the steam generators 7 via the steam pipe 21, the turbine 22 rotates. When the turbine 22 rotates, the power generator 25 connected to the turbine 22 generates power. Thereafter, steam having flowed out from the turbine 22 flows into the condenser 23. A cooling pipe 27 is arranged in the condenser 23. An intake pipe 28 to supply cooling water (for example, seawater) is connected to one side of the cooling pipe 27, and a discharge pipe 29 to discharge cooling water is connected to the other side of the cooling pipe 27. The condenser 23 cools the steam flowing from the turbine 22 by the cooling pipe 27 to return the steam to the liquid. The secondary coolant being in a liquid form is fed to each of the steam generators 7 by the feed-water pump 24 via the feed-water pipe 26. The secondary coolant fed to each of the steam generators 7 becomes steam again by heat-exchange with the primary coolant in the respective steam generators 7.

Meanwhile, an emergency cooling facility is provided in the nuclear installation 1 configured as described above, while assuming occurrence of a loss accident of a primary coolant. As illustrated in FIG. 1, the emergency cooling facility includes a pressure-accumulation and water-injection apparatus 30. As the emergency cooling facility, other than the pressure-accumulation and water-injection apparatus, there is exemplified an injection system using a pump.

Figure 2:
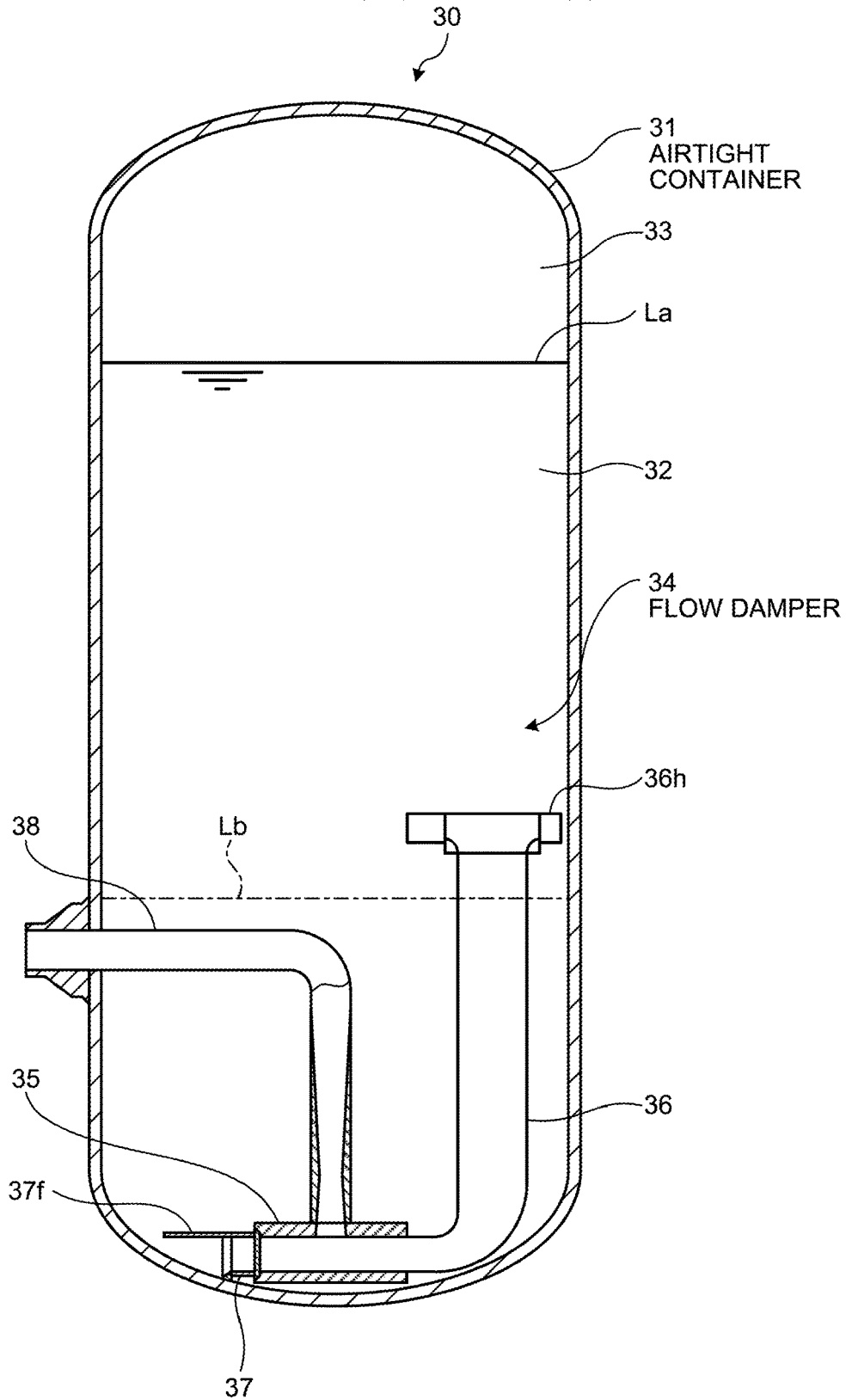
FIG. 2 is a schematic configuration diagram of a pressure-accumulation and water-injection apparatus.
Figure 3:
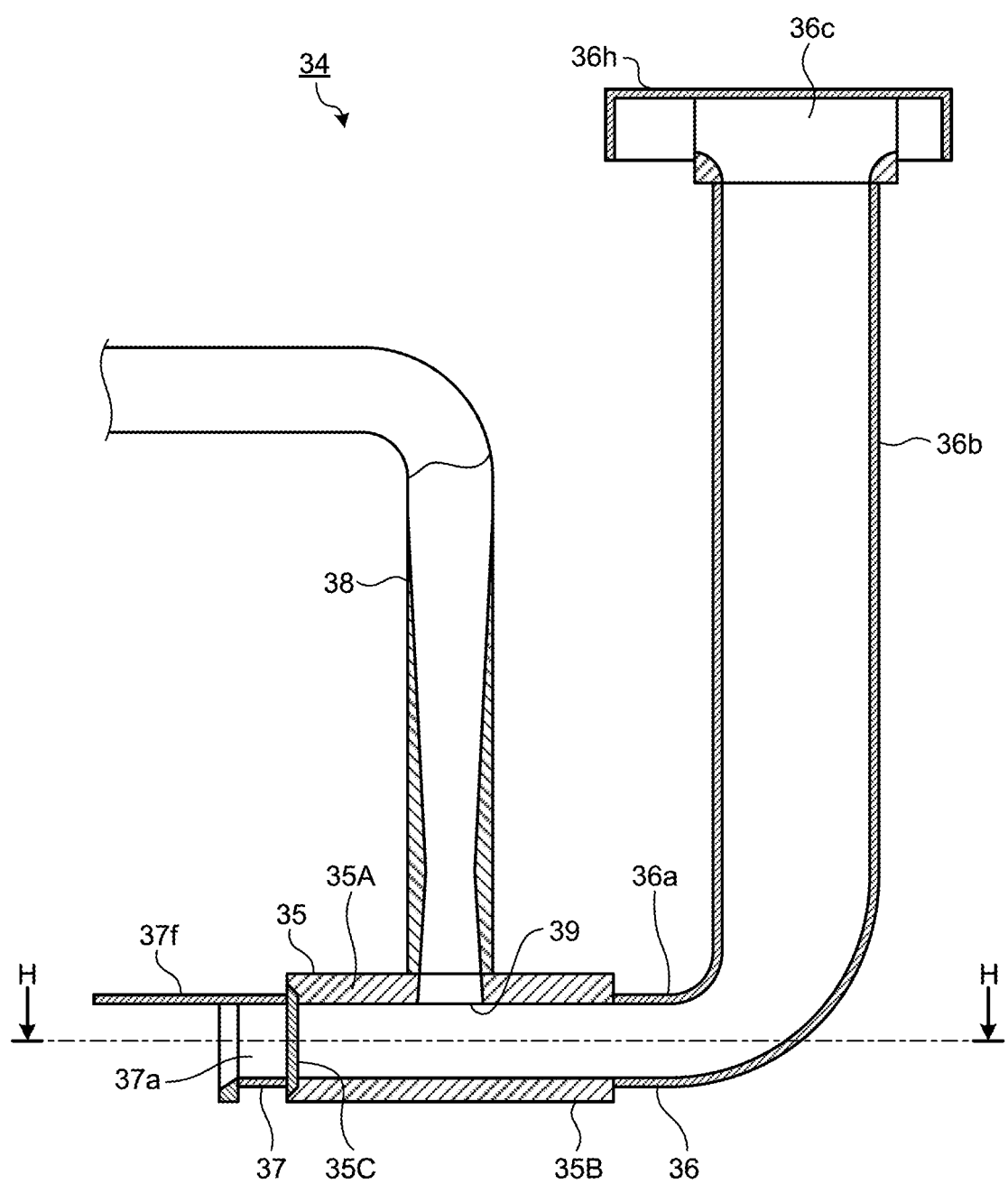
FIG. 3 is a sectional view illustrating a basic configuration of a flow damper.
Figure 4:
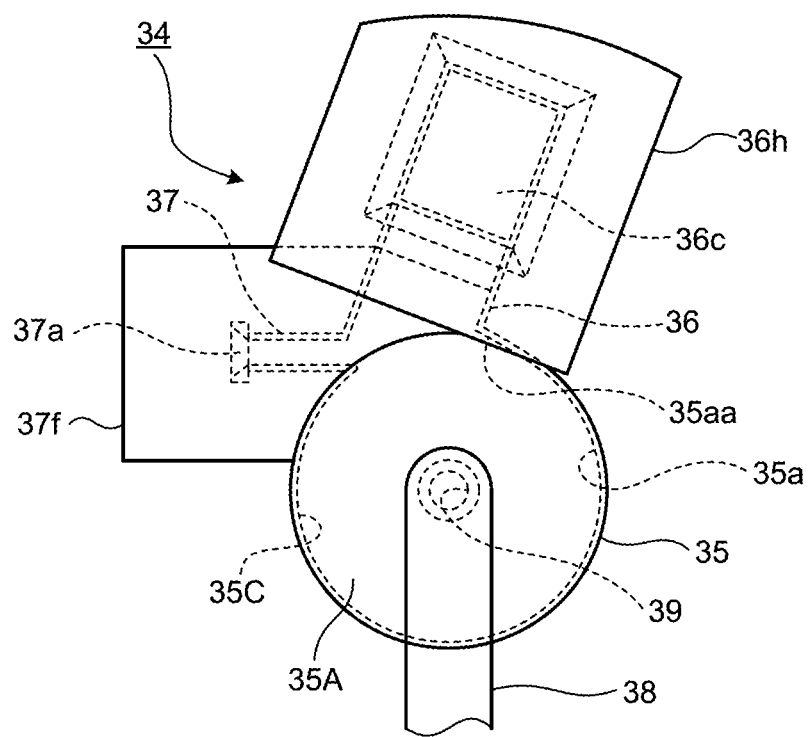
FIG. 4 is a plan view illustrating a basic configuration of the flow damper.
Figure 5:
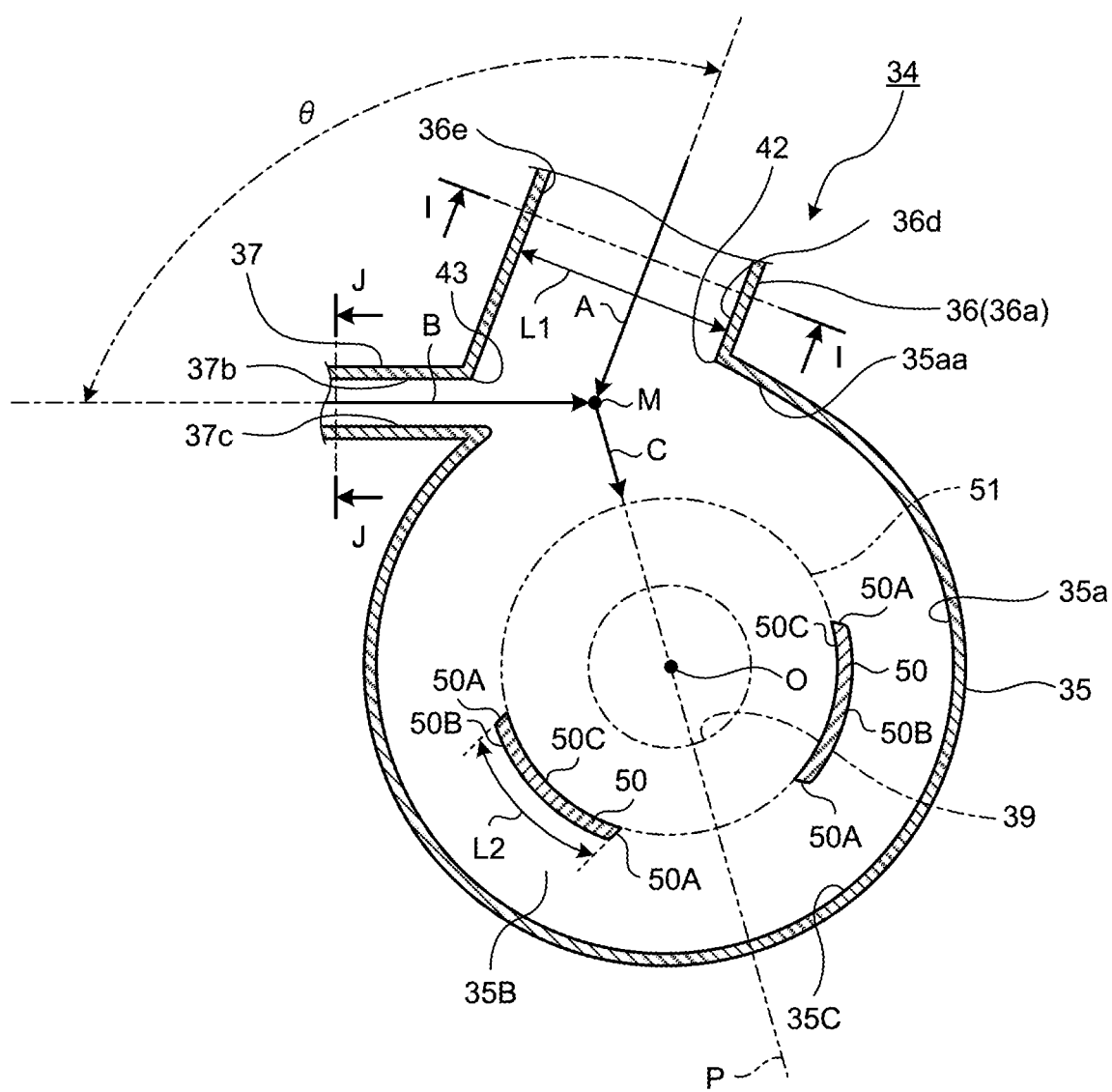
FIG. 5 is a sectional view along a line H-H in FIG. 3.
Figure 6:
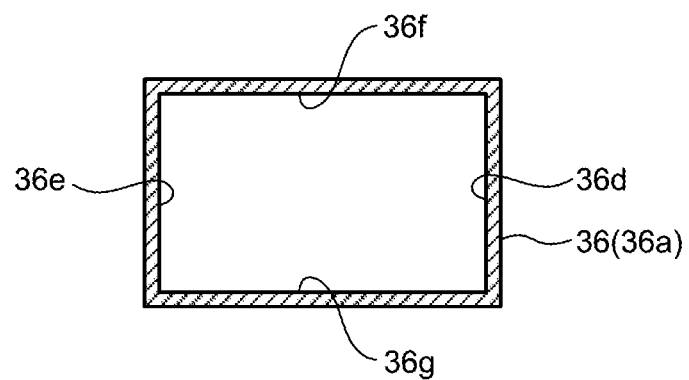
FIG. 6 is an enlarged sectional view along a line I-I in FIG. 5.
Figure 7:
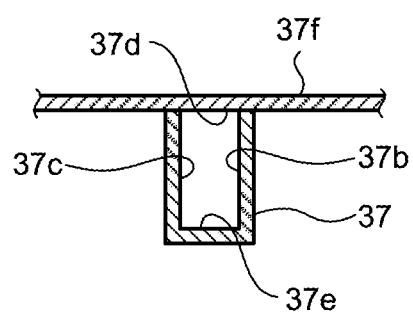
FIG. 7 is an enlarged sectional view along a line J-J in FIG. 5.
Figure 8:
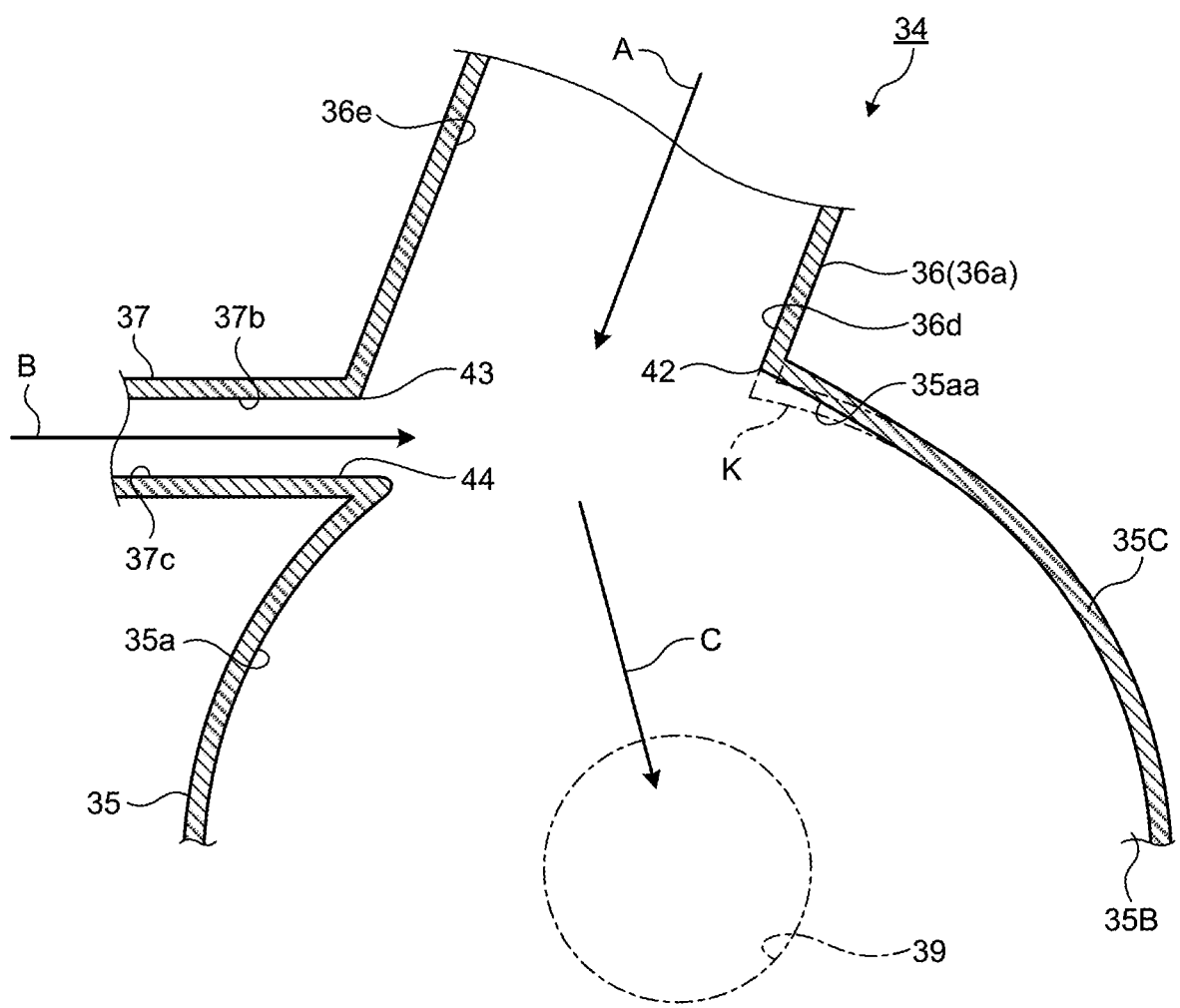
FIG. 8 is an enlarged view of relevant parts in FIG. 5.

FIG. 2 is a schematic configuration diagram of the pressure-accumulation and water-injection apparatus, FIG. 3 is a sectional view illustrating a basic configuration of a flow damper, FIG. 4 is a plan view illustrating a basic configuration of the flow damper, FIG. 5 is a sectional view along a line H-H (a cross sectional view) in FIG. 3, FIG. 6 is an enlarged sectional view (an enlarged view of a longitudinal sectional view) along a line I-I in FIG. 5, FIG. 7 is an enlarged sectional view (an enlarged view of a longitudinal sectional view) along a line J-J in FIG. 5, and FIG. 8 is an enlarged view of relevant parts in FIG. 5.

As illustrated in FIG. 2, the pressure-accumulation and water-injection apparatus 30 includes an airtight container 31 that can store cooling water 32 therein, and a flow damper 34 arranged in the airtight container 31. The pressure-accumulation and water-injection apparatus 30 pressurizes the stored cooling water 32 and injects the pressurized cooling water to the primary cooling system 3 via the flow damper 34. The cooling water 32 is stored in the airtight container 31 and is pressurized by pressurized gas 33 enclosed in an upper part of the airtight container 31. In the airtight container 31, the flow damper 34 that can statically perform switching of a water-injection flow rate from a large flow rate to a small flow rate is arranged.

The flow damper 34 mainly includes a vortex chamber 35, an outlet pipe 38, a small flow-rate pipe (first inlet pipe) 37, and a large flow-rate pipe (second inlet pipe) 36. As illustrated in FIGS. 3 to 7, by arranging a circular top plate 35A and a circular bottom plate 35B at the top and the bottom of the vortex chamber 35 and providing a peripheral plate 35C on peripheral edges thereof, the vortex chamber 35 is famed in a cylindrical shape. The side of the bottom plate 35B of the vortex chamber 35 is fixed to an inner bottom of the airtight container 31.

One end of the outlet pipe 38 is connected to an outlet 39 formed at the center of a circle in the top plate 35A of the vortex chamber 35. The outlet pipe 38 is extended upward from the top plate 35A, bent in a horizontal direction in the middle, and pulled outward of the airtight container 31. As illustrated in FIG. 1, the other end of the outlet pipe 38 pulled outward of the airtight container 31 is connected to the cold leg 6a, which is a low-temperature side pipe of the primary cooling system 3. A check valve 40 to block countercurrent of the coolant from the primary cooling system 3 to the side of the airtight container 31 is provided in the outlet pipe 38 pulled outward of the airtight container 31. The outlet pipe 38 can be provided by connecting one end thereof to the outlet 39 provided at the center of the bottom plate 35B of the vortex chamber 35, and extending the outlet pipe 38 from the bottom plate 35B downward and pulling outward of the airtight container 31.

The large flow-rate pipe 36 and the small flow-rate pipe 37 are connected to a peripheral edge of the vortex chamber 35 with one end being open and the other end passing through the peripheral plate 35C of the vortex chamber 35 respectively. The large flow-rate pipe 36 and the small flow-rate pipe 37 are arranged at positions where the respective other ends thereof are closer to each other than opposite positions putting the outlet 39 therebetween. The large flow-rate pipe 36 and the small flow-rate pipe 37 extend respectively in a different direction relative to the outlet 39.

Specifically, the small flow-rate pipe 37 extends in one direction along a tangential direction of the peripheral plate 35C (a peripheral edge) of the vortex chamber 35 (the left direction side in FIGS. 3 and 5), and the large flow-rate pipe 36 (a horizontal portion 36a thereof) extends in the other direction (the right direction side in FIGS. 3 and 5) in the state of having a predetermined angle θ with respect to the small flow-rate pipe 37.

Cross sections of flow channels of the large flow-rate pipe 36 and the small flow-rate pipe 37 are both in a rectangle shape. That is, as illustrated in FIG. 6, the large flow-rate pipe 36 (the horizontal portion 36a) includes a pair of parallel inner surfaces (vertical surfaces) 36d and 36e facing each other in the horizontal direction, and a pair of parallel inner surfaces (horizontal surfaces) 36f and 36g facing each other in a vertical direction. Meanwhile, as illustrated in FIG. 7, the small flow-rate pipe 37 includes a pair of parallel inner surfaces (vertical surfaces) 37b and 37c facing each other in the horizontal direction, and a pair of parallel inner surfaces (horizontal surfaces) 37d and 37e facing each other in the vertical direction. Heights of the cross sections of the flow channels of the large flow-rate pipe 36 and the small flow-rate pipe 37 (heights of the inner surfaces 36d and 36e, and the inner surfaces 37b and 37c) are the same as the height of an inner periphery 35a of the vortex chamber 35 respectively. Further, in the large flow-rate pipe 36 and the small flow-rate pipe 37, the width of the cross section of the flow channel of the large flow-rate pipe 36 (widths of the inner surfaces 36f and 36g) is larger than that of the small flow-rate pipe 37 (widths of the inner surfaces 37d and 37e).

In the small flow-rate pipe 37, an inlet (an opening at one end) 37a is located at the same height as the inner periphery 35a of the vortex chamber 35. Meanwhile, the large flow-rate pipe 36 includes a stand pipe 36b connected to the horizontal portion 36a, and an inlet (an opening at one end) 36c is located on the upper side than the vortex chamber 35 or the inlet 37a of the small flow-rate pipe 37. However, a water level La of the cooling water 32 is normally located on the upper side than the inlet 36c of the large flow-rate pipe 36. A vortex baffle 36h is provided at the inlet 36c of the large flow-rate pipe 36. A vortex baffle 37f is also provided at the inlet 37a of the small flow-rate pipe 37.

As illustrated in FIGS. 5 and 8, the inner surface 37b of the small flow-rate pipe 37 on the side of the large flow-rate pipe 36 is connected to the inner surface 36e of the large flow-rate pipe 36 on the side of the small flow-rate pipe 37 at a connection portion 43. By taking into consideration an expansion of the jet from the small flow-rate pipe 37 (a ratio of expansion by a free jet), a connection portion 42 between the inner surface 36d of the large flow-rate pipe 36 on the opposite side of the small flow-rate pipe 37 and an extension surface portion (a flat surface portion) 35aa of the inner periphery 35a of the vortex chamber 35 is located more outward than an extension line of the inner surface 37b of the small flow-rate pipe 37 on the side of the large flow-rate pipe 36 (a line extending from the connection portion 43 in the tangential direction. However, the connection portion 42 is not limited thereto, and can have a connection structure in which connection between the inner surface 36d and the inner periphery 35a does not have the extension surface portion (a flat surface portion) 35aa as indicated by a dot-and-dash line K in FIG. 8.

The inner surface 37c of the small flow-rate pipe 37 on the opposite side to the large flow-rate pipe 36 is connected to the inner periphery 35a of the vortex chamber 35 at a connection portion 44. The connection portion 44 is located on a downstream side in a flow direction of the small flow-rate pipe 37 (a jet direction: see an arrow B) with respect to the connection portion 43 described above.

The pressure-accumulation and water-injection apparatus 30 having the configuration described above has functional effects described below. For example, in the nuclear installation 1 described above, in the case where a pipe or the like of the primary cooling system 3 is broken and the primary coolant flows out from the broken part to outside of the system (that is, a loss accident of the primary coolant has occurred), the fuel assemblies 15 may be exposed from the primary coolant. If the primary coolant flows out, the pressure of the primary cooling system 3 decreases to be lower than the pressure in the airtight container 31, and the cooling water 32 in the airtight container 31 is injected from the pipe of the primary cooling system 3 into the nuclear reactor 5 via the check valve 40. Therefore, the fuel assemblies 15 are covered with water again. At this time, a water-injection flow rate to the nuclear reactor 5 is statically switched from the large flow rate to the small flow rate by the action of the flow damper 34.

That is, on the initial stage of water injection, as illustrated in FIG. 2, the water level La of the cooling water 32 in the airtight container 31 is higher than the inlet 36c of the large flow-rate pipe 36. Therefore, as indicated by arrows A and B in FIG. 5, the cooling water 32 in the airtight container 31 flows into the vortex chamber 35 from both the large flow-rate pipe 36 and the small flow-rate pipe 37. As a result, in the vortex chamber 35, influent water (jet) from the large flow-rate pipe 36 and influent water (jet) from the small flow-rate pipe 37 impinge on each other to offset each angular momentum. Therefore, these elements of influent water (impinging jet) move straight ahead toward the outlet 39 as indicated by an arrow C in FIG. 5. That is, a vortex is not famed in the vortex chamber 35 at this time. Therefore, at this time, because the flow resistance decreases at this time, the cooling water 32 flows out with a large flow rate from the outlet 39 and is injected to the nuclear reactor 5.

On the other hand, on the latter stage of water injection, as illustrated in FIG. 2, a water level Lb in the airtight container 31 decreases and becomes lower than the inlet 36c of the large flow-rate pipe 36. Therefore, as indicated by the arrow B in FIG. 5, there is no inflow of the cooling water 32 from the large flow-rate pipe 36 to the vortex chamber 35, and the cooling water 32 flows into the vortex chamber 35 only from the small flow-rate pipe 37. As a result, the influent water from the small flow-rate pipe 37 proceeds to the outlet 39 while foaming vortexes (swirling flow) along the inner periphery 35a of the vortex chamber 35. Therefore, at this time, because the flow resistance becomes high due to a centrifugal force, the flow rate of effluent water (water injection to the containment) from the outlet 39 becomes small.

On the initial stage of water injection, the nuclear reactor 5 is filled with the cooling water 32 at an early stage by performing water injection at a large flow rate, while on the stage when the fuel assemblies 15 are covered with water again on the latter stage of water injection, it is necessary to switch the flow rate of water injection from the large flow rate to the small flow rate, because water injection more than necessary causes outflow of the cooling water 32 from a broken port. The pressure-accumulation and water-injection apparatus 30 according to the present embodiment can perform switching of the flow rate of the water injection without using a dynamic device such as a pump.

In the flow damper 34 having such a configuration, for example, if there is a manufacturing error in the size of the vortex chamber 35, the small flow-rate pipe 37, or the large flow-rate pipe 36, or there is a disturbance in the flow of water flowing into the vortex chamber 35, the balance of the jets respectively flowing from the small flow-rate pipe 37 and the large flow-rate pipe 36 is disrupted. Therefore, there may be a problem in which, at the time of a large flow rate on the initial stage of water injection, the impinging jets of these jets flow in a direction deviated from the outlet 39 to form a swirling flow, thereby increasing the flow resistance and necessary flow rate may not be acquired.

According to the present embodiment, as illustrated in FIG. 5, the flow damper 34 includes a pair of straightening plates 50, 50 provided around the outlet 39. The straightening plates 50 have a first function of straightening the flow so that the influent water (impinging jet) having flowed into the vortex chamber 35 through both the small flow-rate pipe 37 and the large flow-rate pipe 36 flows straight toward the outlet 39, and a second function of straightening the flow so that influent water (jet) having flowed into the vortex chamber 35 through the small flow-rate pipe 37 swirls along the inner periphery 35a of the vortex chamber 35 to flow. In order to realize these functions, the straightening plates 50 extend over from the bottom plate 35B to the top plate 35A of the vortex chamber 35, and are famed in an arc-like shape of a concentric circle 51 having a radius larger than that of the outlet 39, and arranged on the concentric circle 51.

Further, according to the present embodiment, in order to realize the first function, a pair of straightening plates 50, 50 is provided at positions avoiding a path (indicated by the arrow C) extending from an impinging point M, at which the influent water (jet) from the large flow-rate pipe 36 indicated by an arrow A and the influent water (jet) from the small flow-rate pipe 37 indicated by the arrow B impinge on each other, to the outlet 39. According to this configuration, in the case of a normal flow in which the influent water (jet) from the large flow-rate pipe 36 and the influent water (jet) from the small flow-rate pipe 37 are balanced well, the flow of these elements of influent water (impinging jet) is not blocked by the straightening plates 50, and the impinging jets can be guided to move straight ahead to the outlet 39. Further, a width L2 (an arc length) of the straightening plate 50 is defined by a relation with a width L1 of the large flow-rate pipe 36. According to the present embodiment, in order to realize flow straightening at the time of a large flow rate effectively, the widths (arc lengths) of all the straightening plates 50 arranged in the vortex chamber 35 are set to be equal to or larger than the width of the large flow-rate pipe 36, that is, $2L2 \geq L1$. Further, a pair of straightening plates 50, 50 is provided on opposite sides putting therebetween a straight line P extending from the impinging point M to a center point O of the outlet 39 (at line-symmetric positions with respect to the straight line P). According to this configuration, even if the impinging jets of the influent water (jet) from the large flow-rate pipe 36 and the influent water (jet) from the small flow-rate pipe 37 having flowed into the vortex chamber 35 flow biased to either side of the straight line P, any of the straightening plates 50, 50 can straighten the flow toward the outlet 39 reliably.

Figure 9:
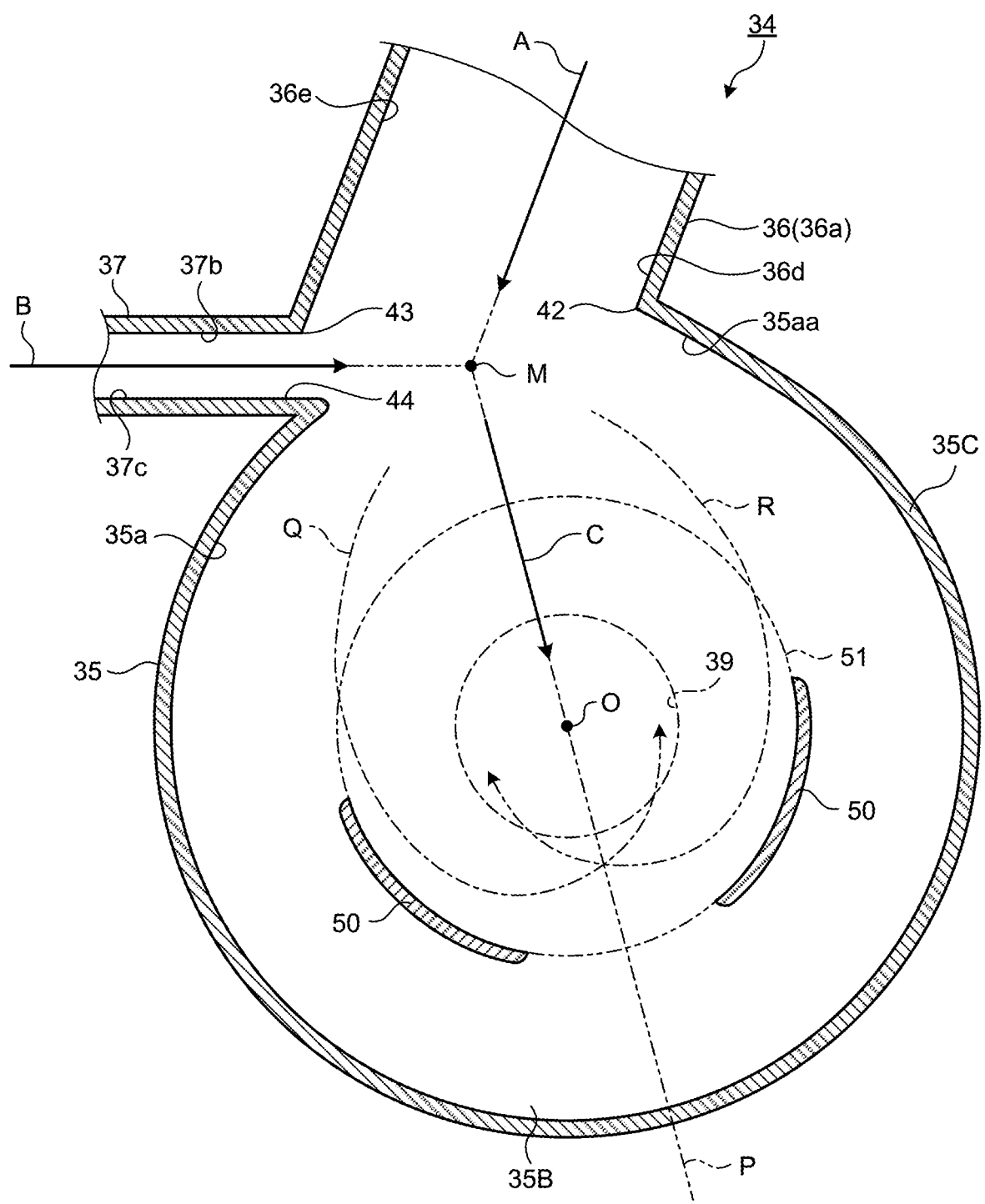
FIG. 9 is an explanatory diagram of an effect of a straightening plate at the time of a large flow rate.

For example, if the influent water from the large flow-rate pipe 36 increases, as compared to a normal state in which the influent water (jet) from the large flow-rate pipe 36 and the influent water (jet) from the small flow-rate pipe 37 are balanced well, the impinging jets of the influent water from the large flow-rate pipe 36 and the influent water from the small flow-rate pipe 37 flow biased to the side of the small flow-rate pipe 37 with respect to the straight line P (to the left side of the straight line P in FIG. 9). In this case, as illustrated in FIG. 9, a part of the biased flow flows as indicated by a dot-and-dash line Q by the straightening plate 50 located on the side of the small flow-rate pipe 37. Accordingly, the entire flow of the impinging jets can be straightened to the flow moving straight ahead toward the outlet 39 as indicated by the arrow C. Further, for example, if the influent water from the large flow-rate pipe 36 decreases as compared to a normal state, the impinging jets of the influent water from the large flow-rate pipe 36 and the influent water from the small flow-rate pipe 37 flow biased to the side of the large flow-rate pipe 36 with respect to the straight line P (to the right side of the straight line P in FIG. 9). In this case, as illustrated in FIG. 9, a part of the biased flow flows as indicated by a two-dot chain line R by the straightening plate 50 located on the side of the large flow-rate pipe 36. Accordingly, the entire flow of the impinging jets can be straightened to the flow moving straight ahead toward the outlet 39 as indicated by the arrow C.

Figure 10:
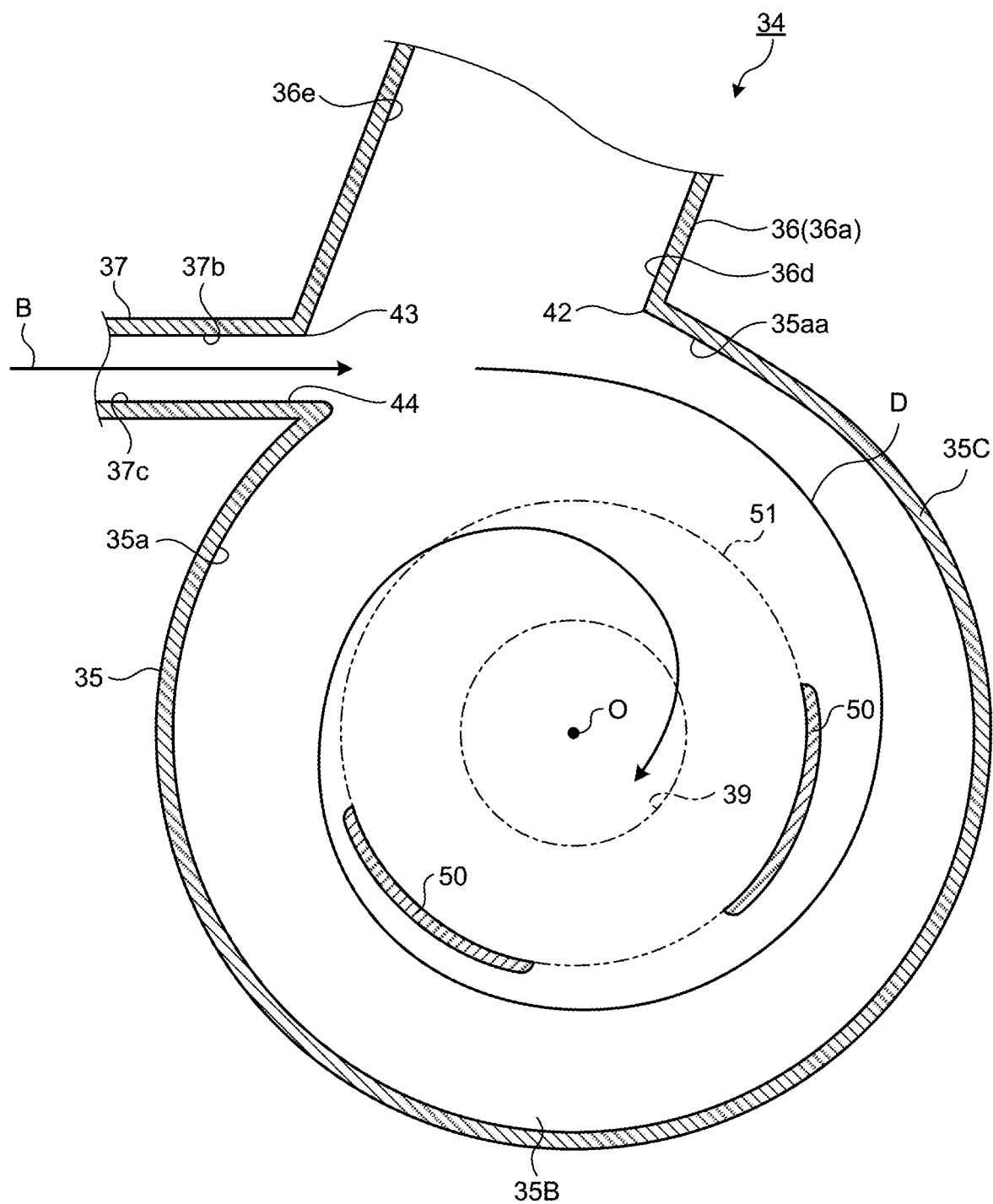
FIG. 10 is an explanatory diagram of an effect of a straightening plate at the time of a small flow rate.

Further, because a pair of straightening plates 50, 50 is famed in the arc-like shape of the concentric circle 51 having a radius larger than that of the outlet 39 and arranged on the concentric circle 51, the flow of the influent water only from the small flow-rate pipe 37 into the vortex chamber 35 is straightened by the straightening plates 50, 50. Subsequently, as indicated by an arrow D in FIG. 10, the influent water from the small flow-rate pipe 37 moves toward the outlet 39 while swirling along the inner periphery 35a of the vortex chamber 35. In this case, because flow of the influent water is straightened by the straightening plates 50, the force of the influent water toward the outlet (center) 39 is dispersed. Therefore, the time while the influent water stays in the vortex chamber 35 can be extended as compared to a case where the straightening plates 50 are not provided.

Figure 11:
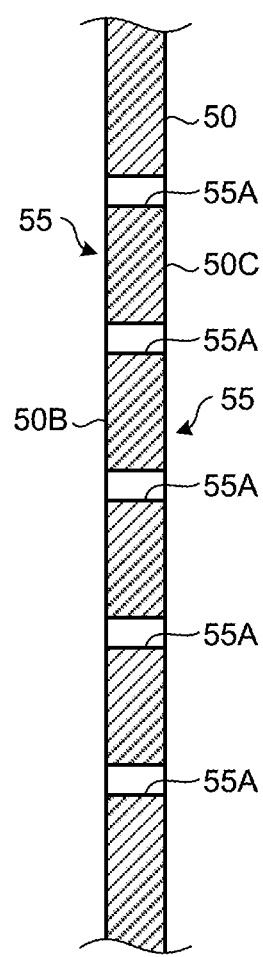
FIG. 11 is a longitudinal sectional view of a straightening plate including uneven portions.
Figure 12:
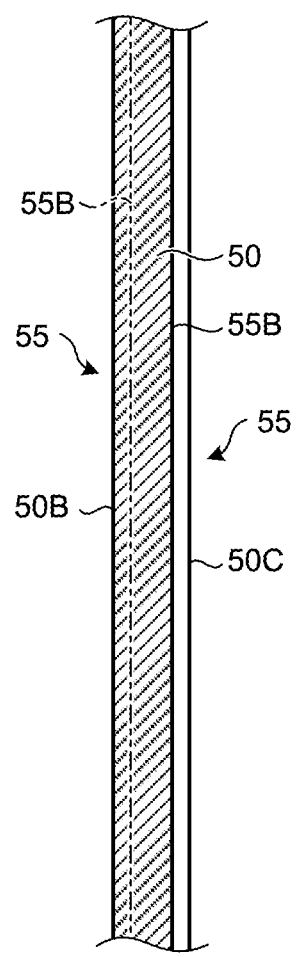
FIG. 12 is a longitudinal sectional view of a straightening plate including uneven portions according to a modification.

Further, according to the present embodiment, in order to realize the second function, as illustrated in FIG. 5, the straightening plates 50 are famed such that the plate thickness of the edges 50A, 50A on the opposite sides extending in a height direction becomes gradually thinner. According to this configuration, the flow of the influent water having flowed into the vortex chamber 35 through the small flow-rate pipe 37 can be smoothly straightened from the side edges 50A of the straightening plates 50 along the surface of the straightening plates 50. Further, in the straightening plates 50, uneven portions 55 (concavo-convex portions) respectively continuous in a circumferential direction (a flow direction) are formed on an outer surface (contact surface) 50B facing the inner periphery 35a of the vortex chamber 35 and on an inner surface (contact surface) 50C facing the outlet 39. The uneven portions 55 become resistance when the influent water from the small flow-rate pipe 37 flows along the outer surface 50B and the inner surface 50C of the straightening plates 50, and for example, as illustrated in FIG. 11, are famed by a plurality of holes 55A provided to penetrate the straightening plate 50. It is preferable that the holes 55A are famed in a diameter smaller than the plate thickness of the straightening plate 50, to increase the resistance when the influent water passes through the holes 55A. Further, the uneven portion 55 can be respectively formed on the outer surface 50B and the inner surface 50C as illustrated in FIG. 12, and configured by a plurality of grooves 55B and 55C extending in parallel along a height direction (a direction orthogonal to the flow direction) of the straightening plate 50. By providing the uneven portion 55 on the outer surface 50B and the inner surface 50C of the straightening plate 50, the outflow resistance of the swirling flow flowing along the inner periphery 35a of the vortex chamber 35 can be increased at the time of a small flow rate. Accordingly, a swirling time during which the flow is swirling in the vortex chamber 35 can be further extended, and with the increase of the swirling time, an amount of flow from the outlet 39 per unit time can be decreased. Therefore, the ratio of the amount of cooling water flowing out from the outlet 39 between at the time of a small flow rate and at the time of a large flow rate can be held high, and the cooling water can be used for water injection over a long time in the airtight container 31 having a capacity limitation.

Figure 13:
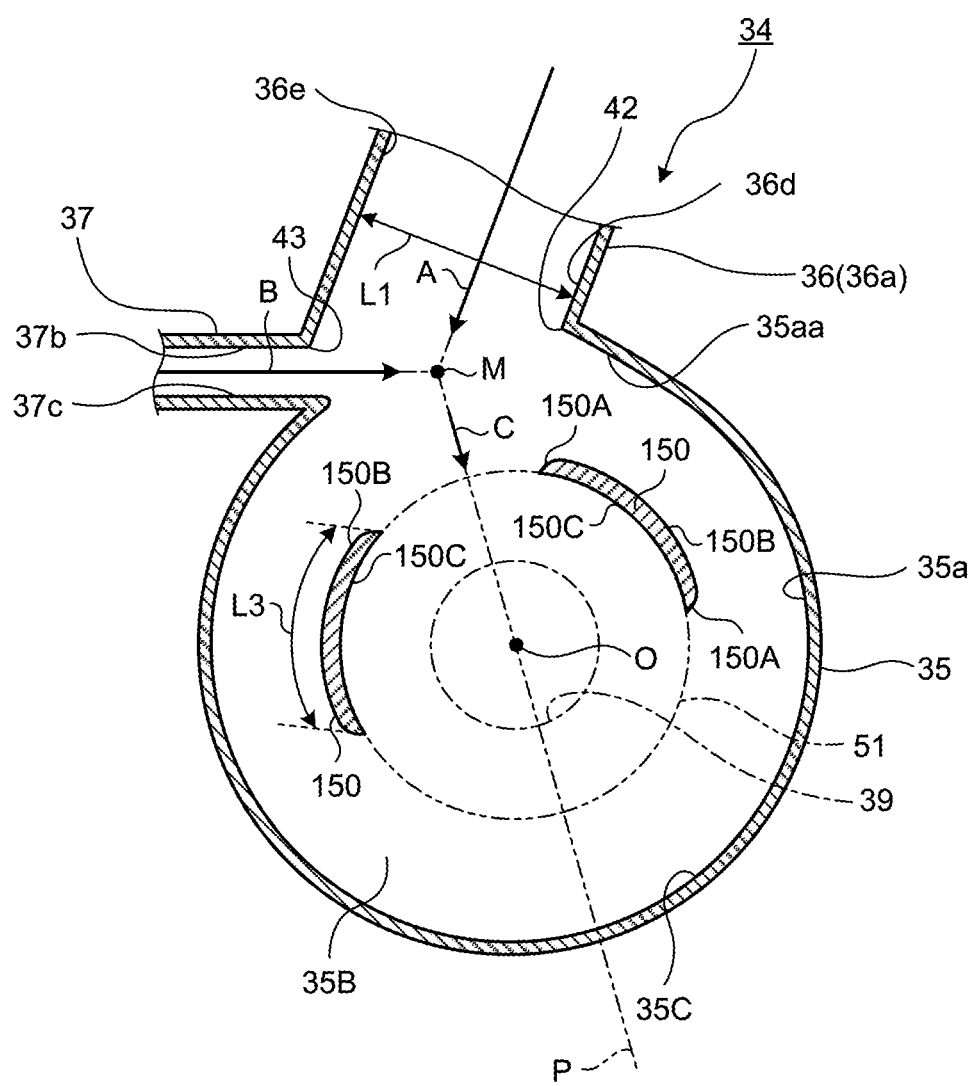
FIG. 13 is a horizontal sectional view of a flow damper including the straightening plate according to the modification.

Next, a flow damper including straightening plates according to a modification is described. The straightening plates are provided at positions avoiding a path extending from an impinging point, at which the jet from the large flow-rate pipe 36 and the jet from the small flow-rate pipe 37 impinge on each other, to the outlet 39 on a concentric circle with the outlet 39. Further, if it is satisfied that the straightening plates are provided on opposite sides putting the straight line P extending from the impinging point to the outlet 39 therebetween, the positions where the current plates are provided, or the size or the number of the straightening plates can be changed appropriately. In the modification illustrated in FIG. 13, a pair of straightening plates 150, 150 is arranged at positions close to the impinging point M (on an upstream side of the impinging jets). Regarding the straightening plates 150, constituent elements identical to those of the straightening plates 50 described above are denoted by like reference signs as those of the straightening plates 50 and descriptions thereof are omitted. In this modification, a width (an arc length) L3 of the straightening plate 150 is set to a width satisfying $2L3 \geq L1$. According to this configuration, even if the balance between the jet flowing from the small flow-rate pipe 37 and the jet flowing from the large flow-rate pipe 36 having flowed into the vortex chamber 35 is disrupted, water injection with a required flow rate can be performed at the time of a large flow rate by straightening the impinging jets toward the outlet 39 by the straightening plates 150. Further, because the flow of the swirling flow flowing along the inner periphery 35a of the vortex chamber 35 is not largely blocked by the straightening plates 150, degradation of the water-injection flow rate at the time of a small flow rate is prevented.

Figure 14:
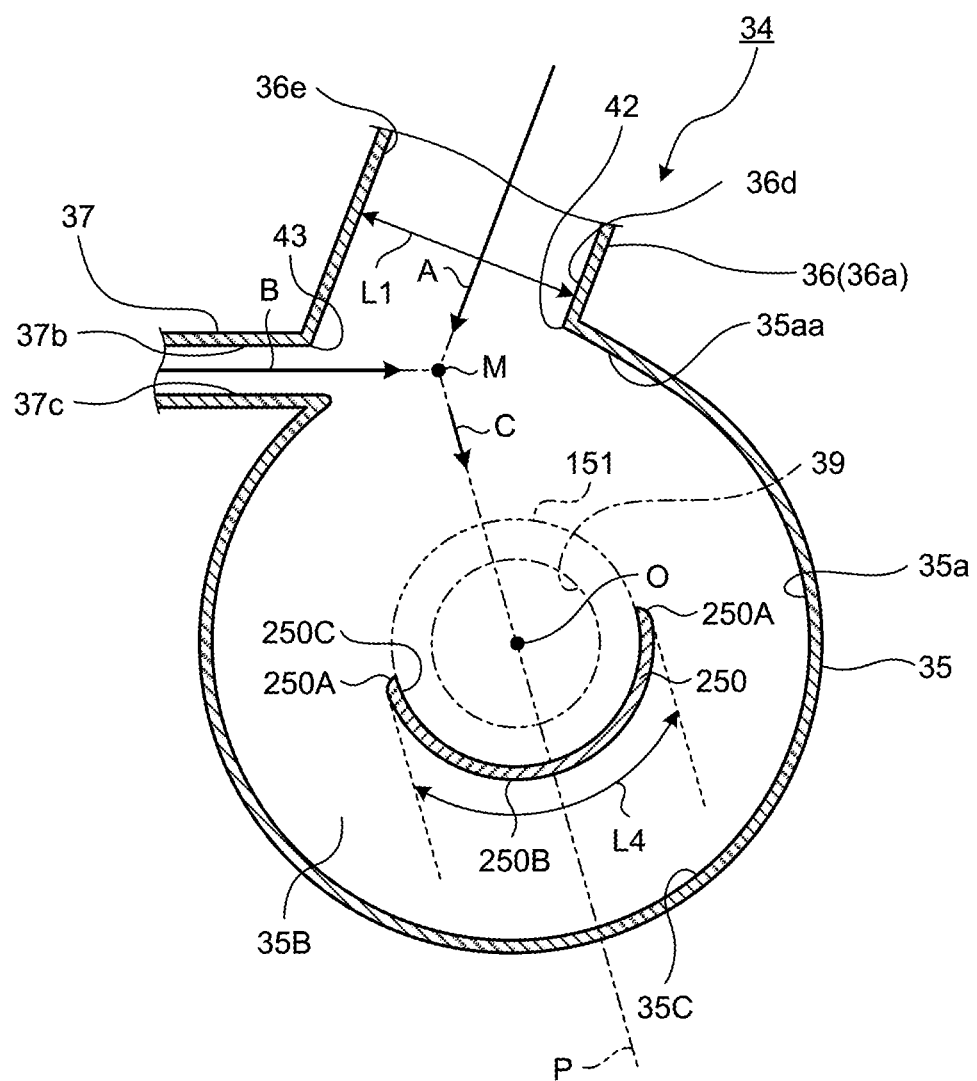
FIG. 14 is a horizontal sectional view of a flow damper including a straightening plate according to another modification.

In a modification illustrated in FIG. 14, a single straightening plate 250 famed in an arc-like shape of a concentric circle 151 of the outlet 39 is arranged. Regarding the straightening plate 250, constituent elements identical to those of the straightening plates 50 described above are denoted by like reference signs as those of the straightening plates 50 and descriptions thereof are omitted. Even if the number of straightening plate 250 is one, as long as the straightening plate 250 satisfies the conditions described above, effects identical to those described above can be obtained. In this modification, a width (an arc length) L4 of the straightening plate 250 is set to a width satisfying $L4 \geq L1$.

Figure 15:
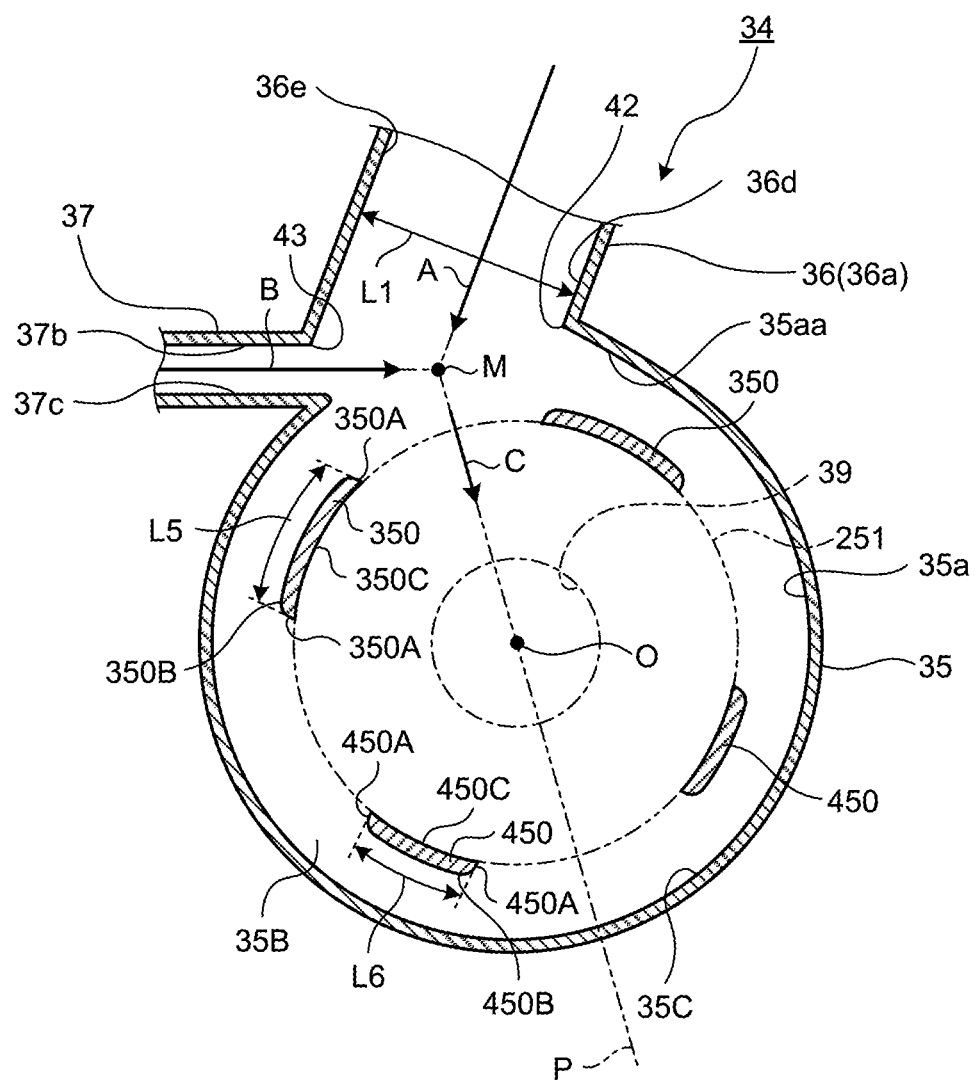
FIG. 15 is a horizontal sectional view of a flow damper including a straightening plate according to still another modification.

Similarly, in a modification illustrated in FIG. 15, two pairs of straightening plates 350, 350, 450, 450 are arranged with a space therebetween in an arc-like shape of a concentric circle 251 of the outlet 39. Regarding the straightening plates 350 and 450, constituent elements identical to those of the straightening plates 50 described above are denoted by like reference signs as those of the straightening plates 50 and descriptions thereof are omitted. If the conditions described above are satisfied, effects identical to those described above can be obtained regardless of the number and positions of the straightening plates 350 and 450. In this modification, a width (an arc length) L5 of the straightening plate 350 and a width (an arc length) L6 of the straightening plate 450 are set to a width satisfying 2L5+2L6≥L1.

As described above, according to the flow damper 34 of the present embodiment, the flow damper 34 is provided with the cylindrical vortex chamber 35, the small flow-rate pipe 37 connected to the peripheral plate 35C of the vortex chamber 35 along the tangential direction thereof, the large flow-rate pipe 36 connected to the peripheral plate 35C with a predetermined angle with respect to the small flow-rate pipe 37, the outlet pipe 38 connected to the outlet 39 formed in the center of the vortex chamber 35, and the straightening plates 50 arranged in a part between the outlet 39 and the peripheral plate 35C of the vortex chamber 35 to straighten the flow of impinging jets of the jet from the small flow-rate pipe 37 and the jet from the large flow-rate pipe 36 flowing into the vortex chamber 35 toward the outlet 39, when the jets from the small flow-rate pipe 37 and the large flow-rate pipe 36 flow into the vortex chamber 35. Therefore, even if the balance between the jet from the small flow-rate pipe 37 and the jet from the large flow-rate pipe 36 flowing into the vortex chamber 35 is disrupted, water injection with a required flow rate can be performed at the time of a large flow rate when jets from the small flow-rate pipe 37 and from the large flow-rate pipe 36 flow into the vortex chamber 35, by straightening the impinging jets toward the outlet 39 by the straightening plates 50. Further, because the straightening plates 50 are provided in the vortex chamber 35, it can be suppressed that the flow damper 34 becomes large.

Further, according to the present embodiment, the straightening plates 50 straighten the flow of the jet from the small flow-rate pipe 37 flowing into the vortex chamber 35 along the inner periphery 35a of the vortex chamber 35, when the jet from the small flow-rate pipe 37 flows into the vortex chamber 35 and the jet from the large flow-rate pipe 36 does not flow into the vortex chamber 35. Accordingly, because the flow of the swirling flow flowing along the inner periphery 35a of the vortex chamber 35 is not largely blocked by the straightening plates 50, degradation of the water-injection flow rate at the time of a small flow rate when the jet flows into the vortex chamber 35 only from the small flow-rate pipe 37 is prevented.

Further, according to the present embodiment, because the straightening plates 50 are famed in the arc-like shape of the concentric circle of the outlet 39, flow straightening at the time of a large flow rate when the impinging jets from the small flow-rate pipe 37 and from the large flow-rate pipe 36 are straightened toward the outlet 39, and flow straightening at the time of a small flow rate when the jet from the small flow-rate pipe 37 is straightened along the inner periphery 35a of the vortex chamber 35 can be realized by the straightening plates 50 having a simple shape.

Further, according to the present embodiment, a pair of straightening plates 50, 50 is provided on the opposite sides putting therebetween the straight line P extending from the impinging point M of the jet from the small flow-rate pipe 37 and the jet from the large flow-rate pipe 36 toward the outlet 39. Accordingly, even if the impinging jets of the influent water (jet) from the large flow-rate pipe 36 and the influent water (jet) from the small flow-rate pipe 37 having flowed into the vortex chamber 35 flow biased to either side of the straight line P, any of the straightening plates 50, 50 can straighten the flow toward the outlet 39 reliably.

Further, according to the present embodiment, in the straightening plates 50, the uneven portions 55 respectively continuous in a circumferential direction (a flow direction) are formed on the outer surface (contact surface) 50B facing the inner periphery 35a of the vortex chamber 35 and on the inner surface (contact surface) 50C facing the outlet 39. Therefore, the outflow resistance of the swirling flow flowing along the inner periphery 35a of the vortex chamber 35 can be increased at the time of a small flow rate. Accordingly, the swirling time during which the flow is swirling in the vortex chamber 35 can be further extended, and with the increase of the swirling time, an amount of flow from the outlet 39 per unit time can be decreased. Therefore, the ratio of the amount of cooling water flowing out from the outlet 39 between at the time of a small flow rate and at the time of a large flow rate can be held high, and the cooling water can be used for water injection over a long time in the airtight container 31 having a capacity limitation. Further, according to the present embodiment, the large flow-rate pipe 36 is a pipe conduit having a diameter larger than that of the small flow-rate pipe 37. Accordingly, the flow rate flowing into the vortex chamber 35 can be easily adjusted.

Further, according to the pressure-accumulation and water-injection apparatus 30 of the present embodiment, the airtight container 31 capable of storing the cooling water 32 in a pressurized state and the flow damper 34 arranged in the airtight container 31 in a mode in which the outlet pipe 38 is pulled out to outside of the airtight container 31 are provided. Therefore, when the cooling water 32 stored in the airtight container 31 in a pressurized state is injected to the outside of the airtight container 31 from the outlet 39 via the flow damper 34, even if the balance between the jet from the small flow-rate pipe 37 and the jet from the large flow-rate pipe 36 flowing into the vortex chamber 35 is disrupted, water injection with a required flow rate can be performed at the time of a large flow rate when jets from the small flow-rate pipe 37 and from the large flow-rate pipe 36 flow into the vortex chamber 35, by straightening the impinging jets toward the outlet 39 by the straightening plate 50. Further, because the straightening plate 50 is provided in the vortex chamber 35, it can be suppressed that the flow damper 34 becomes large, and the flow damper 34 can be arranged orderly in the airtight container 31.

Further, according to the nuclear installation 1 of the present embodiment, the nuclear installation 1 generates a high-temperature fluid by heat generated in the nuclear reactor 5, feeds the high-temperature fluid through the coolant pipes 6a and 6b, and uses the high-temperature fluid therein. The outlet pipe 38 pulled out to the outside of the airtight container 31 in the pressure-accumulation and water-injection apparatus 30 described above is connected to the middle of the coolant pipe 6a leading to the nuclear reactor 5, and the check valve 40 (or an on-off valve) is provided in the middle of the outlet pipe 38. Therefore, when water injection is required to the nuclear reactor 5, and the cooling water 32 stored in the airtight container 31 in a pressurized state is injected to the outside of the airtight container 31 from the outlet pipe 38 via the flow damper 34, even if the balance between the jet from the small flow-rate pipe 37 and the jet from the large flow-rate pipe 36 flowing into the vortex chamber 35 is disrupted, water injection with a required flow rate can be performed at the time of a large flow rate when jets from the small flow-rate pipe 37 and from the large flow-rate pipe 36 flow into the vortex chamber 35, by straightening the impinging jets toward the outlet 39 by the straightening plates 50.

While an embodiment of the present invention has been described above, the present invention is not limited to the embodiment. For example, according to the embodiment described above, a straightening plate is formed in an arc-like shape of the concentric circle of the outlet 39 and is arranged on the concentric circle. However, a side edge of a straightening plate located on the downstream side in a flow direction (in a clockwise direction) at the time of a small flow rate can be arranged closer to the inner periphery 35a of the vortex chamber 35 than a side edge thereof located on an upstream side. According to this configuration, the jet at the time of a small flow rate can be straightened to the side of the inner periphery 35a of the vortex chamber 35 by the straightening plate, thereby enabling to extend the swirling time in the vortex chamber 35.

Further, according to the embodiment described above, the flow damper 34 has a configuration in which a pair of the small flow-rate pipe 37 and the large flow-rate pipe 36 is provided, and straightening plates corresponding to these small flow-rate pipe 37 and large flow-rate pipe 36 are provided. However, needless to mention, the small flow-rate pipe 37 and the large flow-rate pipe 36 can be provided in plural sets and plural sets of straightening plates corresponding to these plural sets of small flow-rate pipe 37 and large flow-rate pipe 36 can be provided.

REFERENCE SIGNS LIST 1 nuclear installation
5 nuclear reactor
6a cold leg (coolant pipe)
6b hot leg (coolant pipe)
6c crossover leg (coolant pipe)
30 pressure-accumulation and water-injection apparatus
31 airtight container
32 cooling water
34 flow damper
35 vortex chamber
36 large flow-rate pipe (second inlet pipe)
37 small flow-rate pipe (first inlet pipe)
38 outlet pipe
39 outlet
50, 150, 250, 350, 450 straightening plate
50A edge
50B outer surface (contact surface)
50C inner surface (contact surface)
51, 151, 251 concentric circle
55 uneven portion (concavo-convex portion)
M impinging point
P straight line

The invention claimed is:

1. A flow damper comprising:
a cylindrical vortex chamber;
a first inlet pipe connected to a peripheral edge of the vortex chamber along a tangential direction thereof;
a second inlet pipe connected to the peripheral edge with a predetermined angle with respect to the first inlet pipe;
an outlet pipe connected to an outlet formed in a central part of the vortex chamber; and
a pair of straightening plates arranged between the outlet and the peripheral edge of the vortex chamber, wherein when jets flow into the vortex chamber from the first inlet pipe and the second inlet pipe, the plates straighten impinging jets from the first inlet pipe and from the second inlet pipe having flowed into the vortex chamber toward the outlet,
wherein the plates of the pair of straightening plates are arranged on opposite sides of a straight line connecting an impinging point of a jet from the first inlet pipe and a jet from the second inlet pipe to a center of the outlet, the jet from the first inlet pipe and the jet from the second inlet pipe impinge on each other to offset angular momentum, and the impinging jets move straight ahead toward the outlet.

2. The flow damper according to claim 1, wherein when a jet from the first inlet pipe flows into the vortex chamber and a jet from the second inlet pipe does not flow into the vortex chamber, the pair of straightening plates straightens a jet from the first inlet pipe having flowed into the vortex chamber along an inner periphery of the vortex chamber.

3. The flow damper according to claim 1, wherein the plates of the pair of straightening plates each are an arc of a concentric circle of the outlet.

4. The flow damper according to claim 1, wherein the pair of straightening plates is provided with a plurality of holes penetrating therethrough on a contact surface that comes into contact with the jet from the first inlet pipe, or a plurality of grooves extending in parallel along a height direction of the straightening plate.

5. The flow damper according to claim 1, wherein the second inlet pipe is a pipe conduit having a diameter larger than that of the first inlet pipe.

6. A pressure-accumulation and water-injection apparatus, comprising:
an airtight container containing pressurized cooling water; and
the flow damper according to claim 1,
wherein the flow damper is arranged within the airtight container with the outlet pipe passing from an interior of the container to an exterior of the container.

7. A nuclear installation that generates a high-temperature fluid by heat generated in a nuclear reactor, comprising:
a coolant pipe providing coolant to the nuclear reactor; and the pressure-accumulation and water-injection device of claim 6,
wherein an exterior end of the outlet pipe is connected to the coolant pipe and a valve is provided in the outlet pipe between the airtight container and the coolant pipe.

* * * * *